United States Patent
Lu et al.

(10) Patent No.: US 7,031,257 B1
(45) Date of Patent: Apr. 18, 2006

(54) RADIO LINK PROTOCOL (RLP)/POINT-TO-POINT PROTOCOL (PPP) DESIGN THAT PASSES CORRUPTED DATA AND ERROR LOCATION INFORMATION AMONG LAYERS IN A WIRELESS DATA TRANSMISSION PROTOCOL

(75) Inventors: Ming Lu, Hillsborough, NJ (US); Haitao Zheng, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 841 days.

(21) Appl. No.: 09/668,243

(22) Filed: Sep. 22, 2000

(51) Int. Cl.
*H04L 12/26* (2006.01)
(52) U.S. Cl. ........................ 370/235; 370/469
(58) Field of Classification Search ................ 370/277, 370/278, 315, 317, 319, 328, 332, 335, 342, 370/338, 389, 394, 441, 466, 469, 471, 474
See application file for complete search history.

(56) References Cited

U.S. PATENT DOCUMENTS

| | | | |
|---|---|---|---|
| 6,148,422 A * | 11/2000 | Strawczynski et al. | 714/704 |
| 6,169,732 B1 * | 1/2001 | Hetherington et al. | 370/335 |
| 6,418,549 B1 * | 7/2002 | Ramchandran et al. | 714/811 |
| 6,507,572 B1 * | 1/2003 | Kumar et al. | 370/335 |
| 6,507,582 B1 * | 1/2003 | Abrol | 370/394 |
| 6,532,211 B1 * | 3/2003 | Rathonyi et al. | 370/230 |
| 6,601,209 B1 * | 7/2003 | Lewis et al. | 714/756 |
| 6,618,375 B1 * | 9/2003 | Rezaiifar et al. | 370/394 |
| 6,697,352 B1 * | 2/2004 | Ludwig et al. | 370/349 |
| 6,718,500 B1 * | 4/2004 | Lee et al. | 714/749 |
| 6,931,569 B1 * | 8/2005 | Fong et al. | 714/18 |
| 2002/0036993 A1 * | 3/2002 | Park et al. | 370/329 |
| 2004/0039833 A1 * | 2/2004 | Ludwig et al. | 709/230 |

* cited by examiner

*Primary Examiner*—Chi Pham
*Assistant Examiner*—Anh-Vu Ly

(57) ABSTRACT

A radio link protocol (RLP)/point-to-point protocol (PPP) design is disclosed for wireless multimedia packet networks that passes corrupted packet data and error location information among OSI layers. The RLP layer provides erasure data frames and optionally error location indicators to the PPP layer. When the PPP layer has access to the erasure data frames, the data frames can be padded with a predefined value, such as all zeroes "0" to prevent error propagation from one data frame (or octet) to the following data frames (or octets). When the PPP layer has access to the error location information, the PPP layer can detect if the PPP packet header is corrupted. When a valid header is detected, the PPP layer forwards the packet payload to the higher layers (TCP, UDP) whether or not the payload is properly received. Thus, the application has access to all the usable information, so the application can determine whether and how to utilize the information. The RLP/PPP design of the present invention allows packets with partially corrupted payloads to still be forwarded to the UDP layer and then to the application layer.

27 Claims, 5 Drawing Sheets

RADIO LINK PROTOCOL (RLP)/POINT-TO-POINT PROTOCOL (PPP) DESIGN THAT PASSES CORRUPTED DATA AND ERROR LOCATION INFORMATION AMONG LAYERS IN A WIRELESS DATA TRANSMISSION PROTOCOL

CROSS-REFERENCE TO RELATED APPLICATION

The present invention is related to U.S. patent application Ser. No. 09/668,242 entitled "Complete User Datagram Protocol (CUDP) for Wireless Multimedia Packet Networks Using Improved Packet Level Forward Error Correction (FEC) Coding," filed contemporaneously herewith, assigned to the assignee of the present invention and incorporated by reference herein.

FIELD OF THE INVENTION

The present invention relates generally to wireless packet networks, and more particularly, to methods and apparatus for reducing lost or corrupted packets in such wireless packet networks.

BACKGROUND OF THE INVENTION

It is inevitable that future wireless services will support Internet Protocol (IP)-based multimedia applications. For example, current and emerging wireless networks allow (i) a user to download information from the Internet using a wireless communication device, (ii) Internet-to-mobile or mobile-to-mobile videoconferences, (iii) streaming of video or audio information (or both) from the Internet to a wireless communication device, and (iv) electronic-commerce applications. In the end-to-end path of many wireless multimedia sessions, such as an Internet-to-mobile communication, a number of heterogeneous network technologies are involved, with the multimedia packets being sent from an originating server, through the Internet and then over one or more wireless packet networks to the mobile destination.

Wireless packet networks encounter packet losses between a base station and a mobile receiver as a result of channel errors and network congestion. Furthermore, such packet losses can be random or bursty, depending on the environment, rate-of-motion and network loading. In order to accommodate the ever growing demand for advanced multimedia services, such as voice, real-time audio and video, packet data and circuit data, a number of layers in typical wireless data transmission protocols, such as the Link Access Control (LAC), Medium Access Control (MAC) and Radio Link Protocol (RLP) layers, must provide improved efficiency and reduced latency to a wide range of upper layer services.

A transmitter in a wireless packet network forms application messages into packets at the Transmission Control Protocol (TCP) and User Datagram Protocol (UDP) layers. Thereafter, the Point-to-Point Protocol (PPP) and Internet Protocol layers add address and control header information to the packets. At the Radio Link Protocol layer, the PPP/IP packets are further segmented into multiple data frames with separate RLP headers, to accomplish physical layer transmissions.

At the receiving host, the RLP layer receives data frames from the physical layer, where data frames can be corrupted by channel errors, and evaluates the validity of the data frames. For error-free data frames, the RLP layer removes the RLP header, which contains the sequence number of the associated data frame, and forwards the data frames to the PPP layer. At the same time, corrupted data frames are discarded without being forwarded to the upper layers. Generally, the RLP layer forwards only data frames that are actually received without any errors to the higher layer in sequence order. Thus, the upper layer does not have any error information, often referred to as erasure data frame information, or the corresponding erasure data.

The immediate layer above the RLP layer is the point-to-point protocol layer. If the packet header is valid, the PPP layer forwards the packet to the TCP/UDP layer. In wireless packet networks, packet loss due to channel errors and network congestions can be recovered at the TCP layer. Specifically, the TCP layer requests retransmission of the lost packets until a correct version is received.

Non-real-time services, such as data transmissions in accordance with the File Transfer Protocol (FTP), use the TCP protocol since there is no delay constraint. Most streaming applications and real-time applications, however, including multimedia applications, have more significant delay constraints and allow a limited number of retransmissions, if any. Thus, these delay sensitive services employ a User Datagram Procotol, described, for example, in J. Postel, "User Datagram Protocol," Request for Comments RFC 768, ISI (August 1980), incorporated by reference herein, as their transport protocol. Compared to the TCP protocol, the UDP protocol has lower overhead and no retransmission delays, which makes it attractive to delay-sensitive applications. The UDP protocol employs a cyclic redundancy check (CRC) to verify the integrity of packets, in a known manner. The UDP protocol can detect any error in the packet header or payload and discards the packet if an error is detected. As such, the UDP protocol only forwards the error free packets to the application layer, and discards the corrupted packets. Compared to the TCP protocol, the UDP protocol can detect the corrupted packets, but cannot initiate retransmission to recover the corrupted/lost packets.

Since a single TCP/UDP packet corresponds to multiple data frames, the packet loss rate seen by the TCP/UDP layer is the number of data frames times the frame loss rate. Since the TCP/UDP packets are usually much larger compared to the frame size, the packet loss seen by the TCP/UDP layer will be considerably large even for low or medium frame loss rate. For applications employing the UDP protocol, this yields poor performance and additional channel resource consumption. The inefficiency of such a protocol stack design in wireless networks arises from the fact that the erroneous data frames, once detected, are not forwarded to the UDP and application layers. Therefore, a packet is discarded when only a small portion of the packet is corrupted. This also implies that the error-free data within the packets are discarded. Indeed, current and emerging multimedia coding technologies are focusing on improved error resilience, such that the media decoder can tolerate a certain number of channel errors. Therefore, the error-free part of the packets can still be utilized by the applications. In addition, the error location information can help the application to locate the channel error and apply certain recovery and concealment techniques.

SUMMARY OF THE INVENTION

We have recognized that the problems of packet loss in conventional wireless systems may be overcome by a revised protocol stack design that reduces or avoids unnecessary packet discarding, such as one that employs a revised RLP/PPP design that forwards channel error information to higher layers such that the application layer can utilize the useful information to achieve better performance.

More specifically, we have developed a radio link protocol/point-to-point protocol design that passes corrupted packet data and error location information among various layers in a wireless data transmission protocol. Advantageously, in accordance with one aspect of the invention, the erasure information that conventional protocol designs discard, is employed to provide a flexible and efficient packet delivery.

In one implementation, referred to as the Forward Erasure Frame Option, the RLP layer passes erasure data frames to the PPP layer, where the data frames are padded with a predefined value, such as all zeroes "0". The Forward Erasure Frame Option can prevent error propagation from one data frame to the following data frames (since subsequent frames are no longer dropped) and reduces the unnecessary packet loss due to frame order mismatching.

In another implementation, referred to as the Forward Erasure Frame+Erasure Indicator Option, the RLP layer also provides a location indicator indicating the location of the erasure data within the frame to the PPP and the upper layers, in addition to forwarding the erasure data frames. Under the Forward Erasure Frame+Erasure Indicator Option, the PPP layer can use the location indicator to identify the location of any errors and thereby detect if the PPP packet header is corrupted. When a valid header is detected, the PPP layer forwards the packet payload to the higher layers (TCP, UDP) whether or not the payload is properly received. Thus, the application can decide whether to skip the packet. The RLP/PPP design of the present invention allows packets with partially corrupted payloads to still be forwarded to the UDP layer and then to the application layer. Thus, the present invention provides the application with access to all the usable information, so the application can determine whether and how to utilize the information.

DETAILED DESCRIPTION

Figure 1:
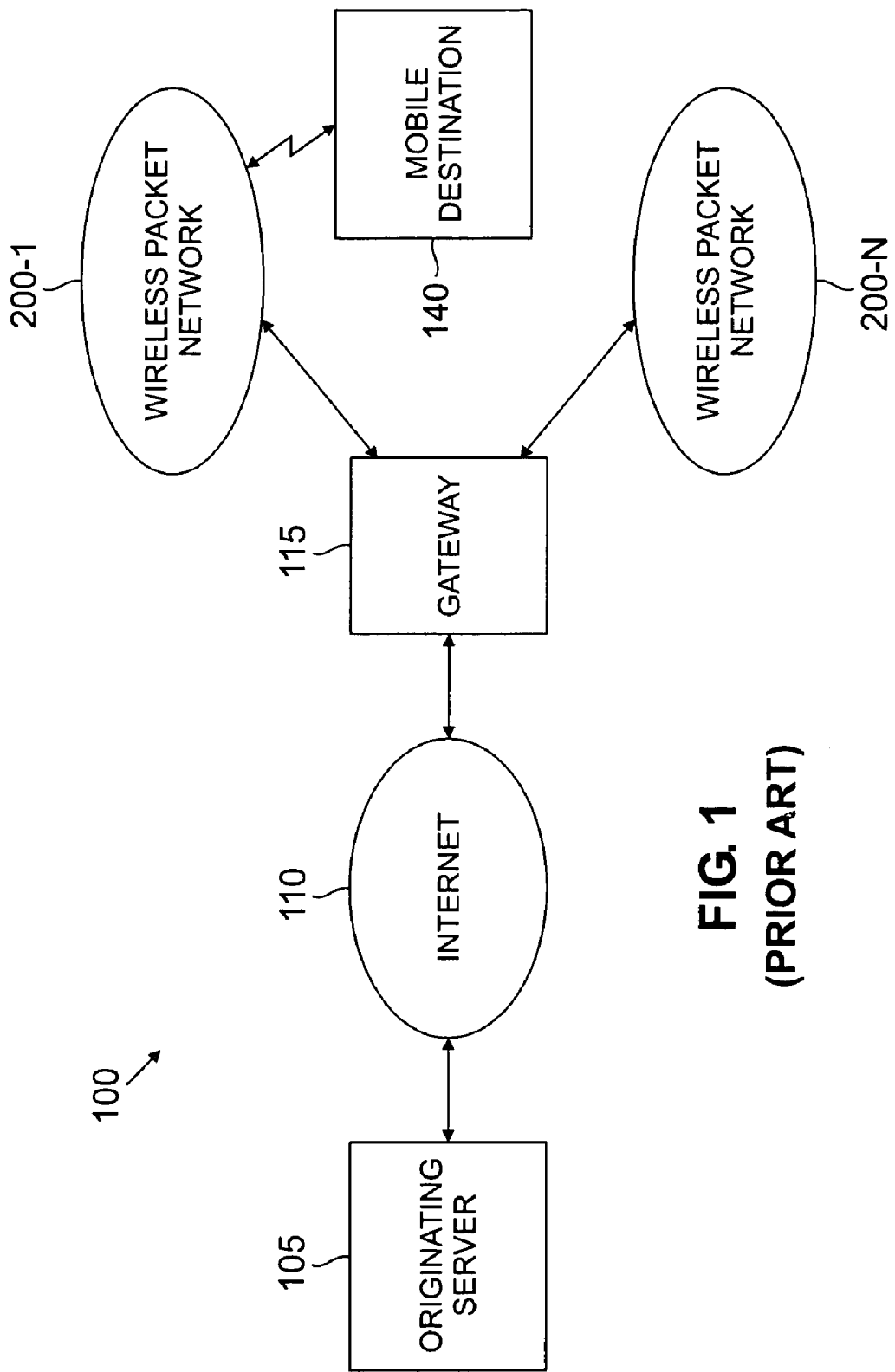
FIG. 1 illustrates a conventional multimedia network environment.
Figure 2:
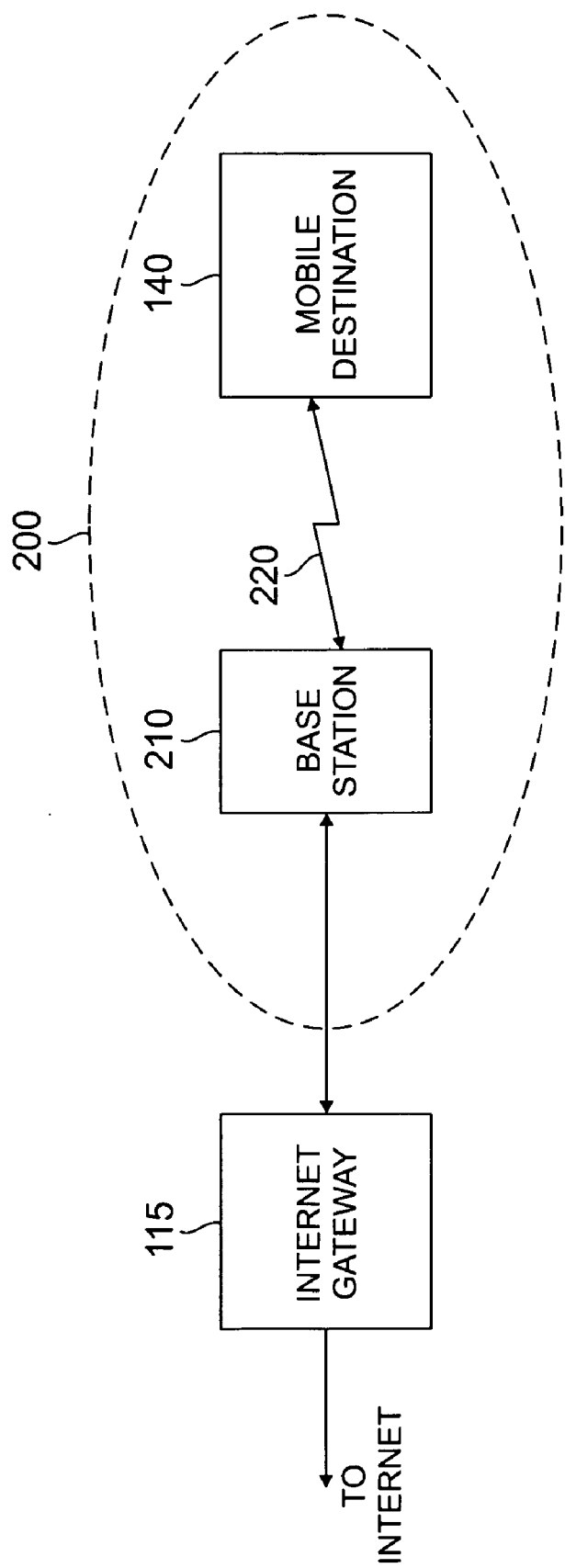
FIG. 2 illustrates a conventional wireless packet network of FIG. 1 in further detail.

FIG. 1 illustrates a conventional heterogeneous network environment 100 that supports IP-Wireless data communications. Multimedia packets being sent from an originating server 105, through the Internet 110 and then over one or more wireless packet networks 200-n, shown in further detail in FIG. 2, to the mobile destination 140.

Figure 3A:
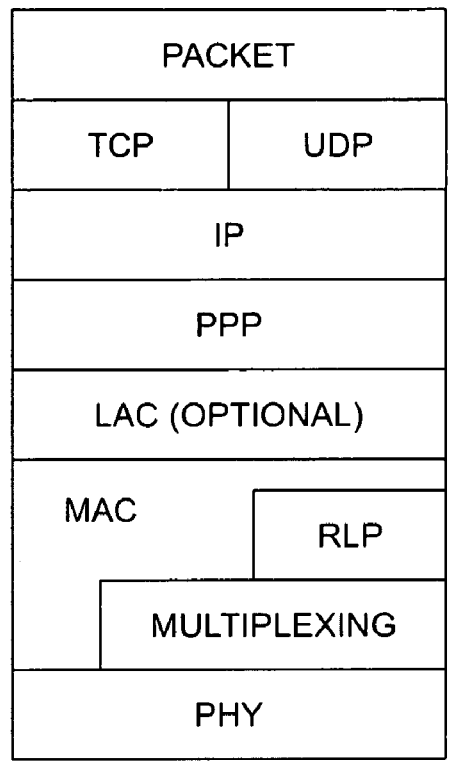
FIGS. 3A and 3B illustrate the protocol structures for the UMTS/CDMA 2000 standard and the Qualcom HDR proposal, respectively.
Figure 3B:
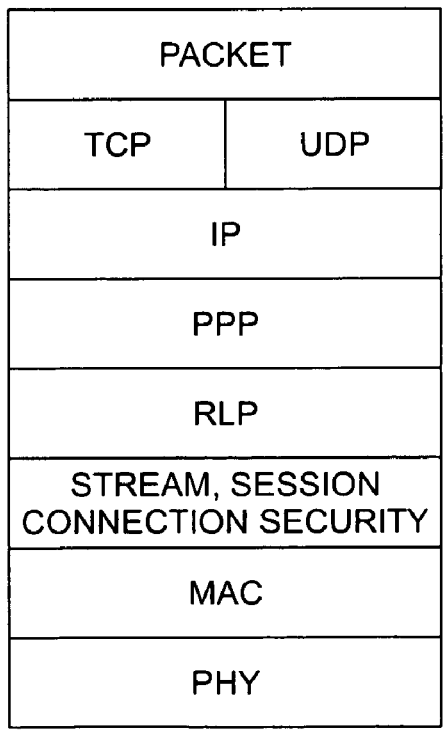

FIGS. 3A and 3B illustrate the protocol structures for the UMTS/CDMA 2000 standard and the (HDR) proposal respectively. For a more detailed discussion of the protocol structures for the UMTS/CDMA 2000 standard and the Qualcom HDR proposal, see E. Dahlman et al., "UMTS/IMT-2000 Based on Wide Band CDMA", IEEE Communications Magazine, Vol. 36, No. 9, 70–80 (1998), ETSI UMTS YY.01, YY.02, CDMA2000:TIA/EIA/IS-2000 and P. Bender et al., "CDMA/HDR: A Bandwidth-Efficient High-Speed Wireless Data Services For Nomadic Users", IEEE Communications Magazine, Vol. 38, No. 7: 70_77, July 2000, incorporated by reference herein. The RLP layer shown in FIGS. 3A and 3B employs re-transmissions to reduce the error rate over the air-link to a value similar to that found on a typical landline. However, the RLP layer typically provides only a "best effort" level of reliability and does not attempt to guarantee over-the-air delivery.

In general, the multimedia services can be classified into two categories. Real-time services generally have delay constraints but can tolerate channel errors, and include interactive services, such as voice, voice-over-IP, packet video/audio, videoconference applications. Non-real-time services, on the other hand, are generally sensitive to channel errors but have more relaxed latency requirements, and include Web browsing, electronic mail and file transfer protocol applications. It is noted, however, that non-real-time services for wireless systems should still provide a reasonable level of latency in order to be compatible with performance in wired networks, such as the Internet.

For real-time services, such as videoconference, streaming video/audio and voice-over-IP applications, the RLP layer requests zero or very few retransmissions due to strict delay constraints. For non-real-time services, however, such as FTP and electronic mail services, the RLP layer can be configured to allow a large number of retransmission to reduce information loss (since the nature of the non-real-time service allows time to retransmit).

The current RLP designs under the UMTS/CDMA 2000 and HDR proposals maintain two sequence number variables, where L_V(N) represent the sequence number of the next data frame (octet in HDR) and L_V(R) represents the sequence number of the next expected new data frame (octet in HDR). The RLP layer also maintains a NAK list where each entry contains an associated timer for a data frame that requires retransmission (i.e., the "retransmission abort timer"). The multiplex sub-layer categorizes every received data block and supplies the data block's category and accompanying bits, if any, to the RLP layer. When the multiplex sub-layer detects a corrupted data block, the multiplex sub-layer classifies the block as an erasure block, and sends the corresponding category indicator to the RLP layer, without any accompanying payload bits. The RLP layer passes only the error-free data frame to the higher layer, in sequence number order.

For any erasure data frame having an unexpired retransmission timer, the RLP layer shall request retransmission. If the timer has expired and the RLP layer has not received a retransmitted data frame, the RLP layer will remove the associated NAK entry and increment the sequence number counter, L_V(N), to the ascending data frame. Therefore, the missing data frames are never forwarded to the higher layer. In other words, the RLP layer forwards only the error-free data frames it has to the higher layer in sequence order and continues reception beyond the missing data frames.

As shown in FIGS. 3A and 3B, the immediate layer above the RLP layer is the point-to-point protocol layer, which is defined in IETF RFC 1661. In the current system, there is no direct relationship between PPP packets and the RLP data frames. When forwarding data frames to the PPP layer, the RLP layer removes the RLP header, which contains the sequence number of the associated data frame. Therefore, the RLP layer supplies the bit streams to the PPP layer without any data frame structure. In this case, the PPP layer does not have erasure data frame information. As previously indicated, data loss in a single packet under current RLP/PPP designs will destroy the packets that follow, yielding unnecessary packet loss.

For TCP based applications, additional packet level retransmission can be initiated by the TCP protocol once the TCP protocol detects an invalid packet. This can provide a remedy for the packet loss, although extra time and channel resources are required, and results in higher service costs for the service provider. For non-real-time services, such as FTP services, the impact might be insignificant. For real-time services, however, delay constraints are based on the UDP protocol, which does not rely on packet level retransmission. In addition, the retransmission in the RLP layer can be very limited. In this case, the RLP/PPP loss generates a negative impact on application quality.

RLP/PPP Design for Real-time Services

As can be seen from the previous section, under current RLP/PPP protocol designs, the RLP layer does not pass the erasure data frame to the PPP layer, which yields multiple packet damage. For non-real-time services, this results in very significant packet level retransmission, thereby consuming extra channel resource and creating unnecessary traffic loads. From a service provider point of view, higher channel resource consumption also leads to increased service cost. For real-time services, the current RLP/PPP design yields significant packet losses and thus unsatisfactory performance.

One drawback of the current RLP/PPP design is the lack of appropriate communication between the RLP and PPP layers. In particular, the RLP layer fails to forward the erasure data frame (or octet) to the PPP layer, and also fails to indicate the location of the erasure data. Such inefficiency results in unnecessary information loss. According to one feature of the present invention, a new RLP/PPP design is disclosed that utilizes the erasure information to provide a flexible and efficient packet delivery.

Figure 4:
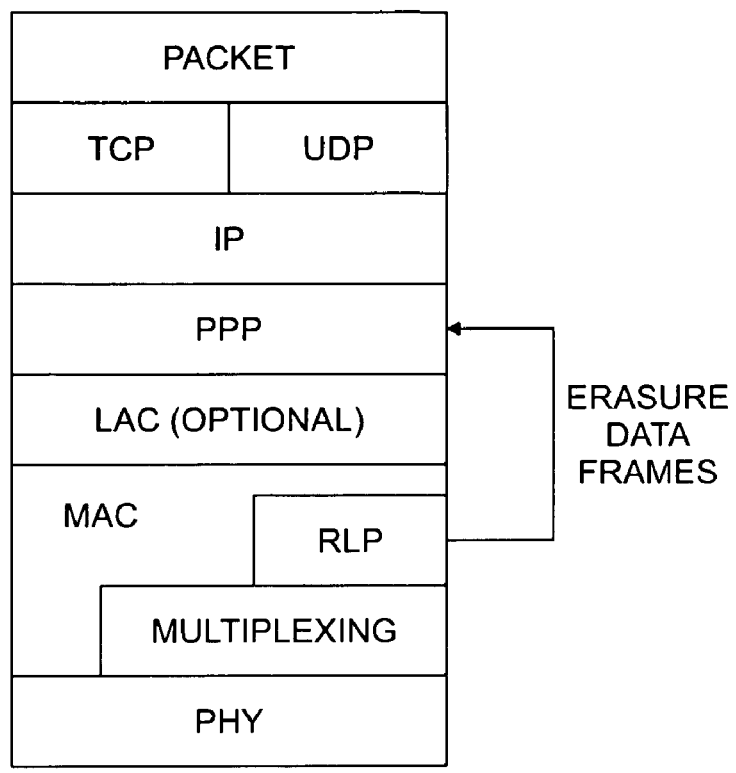
FIG. 4 illustrates a Forward Erasure Frame RLP/PPP Option for the illustrative UMTS/CDMA 2000 layer structure of FIG. 3A that forwards erasure date frames to the PPP layer in accordance with the present invention.

In one implementation, referred to as the Forward Erasure Frame Option and shown in FIG. 4 for the illustrative UMTS/CDMA 2000 layer structure, only revisions to the RLP layer are required. The RLP layer passes erasure data frames to the PPP layer, where the data frames can be padded, for example, as all zeroes "0." The Forward Erasure Frame Option can prevent error propagation from one data frame (or octet) to the following data frames (or octets). The Forward Erasure Frame Option also reduces the unnecessary packet loss due to frame order mismatching.

Figure 5:
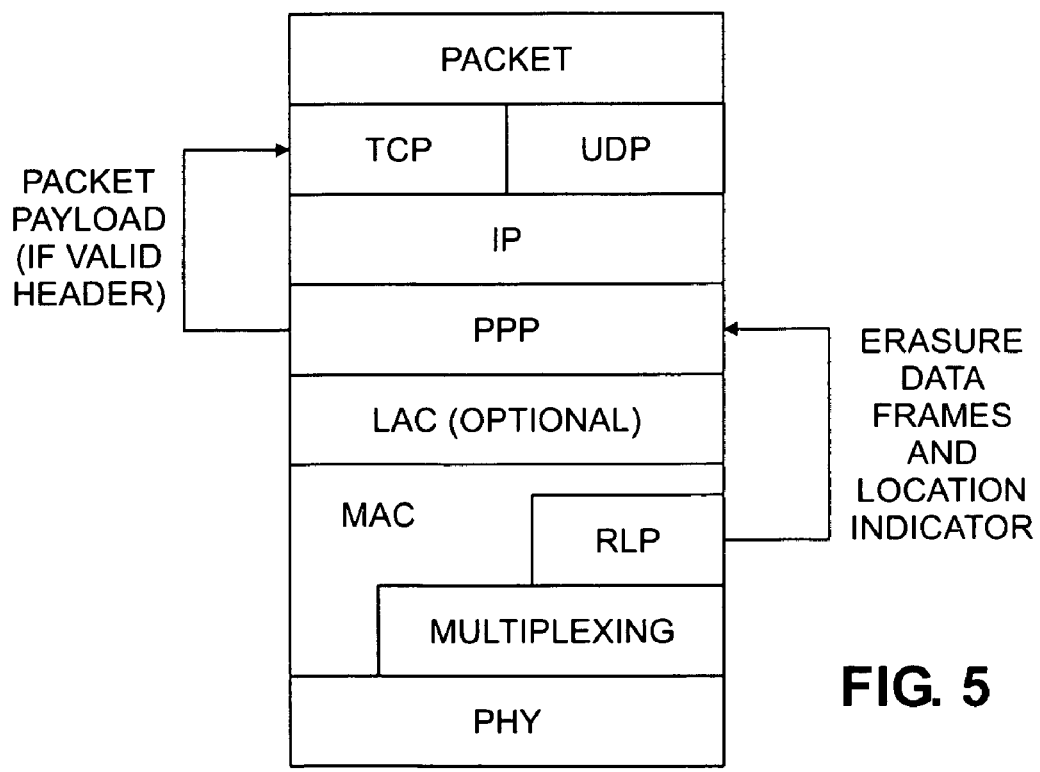
FIG. 5 illustrates a type I Forward Erasure Frame+Erasure Indicator RLP/PPP Option for the illustrative UMTS/CDMA 2000 layer structure of FIG. 3A that forwards erasure date frames and error location information to the PPP layer and packet payloads to the TCP/UDP layer in accordance with the present invention.

In another implementation, referred to as the type I Forward Erasure Frame+Erasure Indicator Option and shown in FIG. 5 for the illustrative UMTS/CDMA 2000 layer structure, both the RLP and PPP layers are modified. In addition to forwarding the erasure data frames, the RLP layer also provides a location indicator of the erasure frames to the PPP layer, or a starting and ending address entry for the erasure data. The specific implementation of such an indicator is system dependent, as would be apparent to a person of ordinary skill in the art.

Using the location indicator, the PPP layer can detect if the PPP packet header is corrupted. With a valid header, the PPP layer should forward the packet payload to higher layers (TCP, UDP) whether or not the payload is properly received. It is noted that the decision of whether or not to discard the packet should be performed at the TCP and UDP layer, thereby allowing further communications from the application to the TCP/UDP layer. Thus, the application can decide whether to skip the packet. In particular, multimedia services, such as video, audio and voice services, are designed to be robust against channel error to a certain level. And the partially error-free packets can provide improvement to the media quality, especially for large packets.

Figure 6:
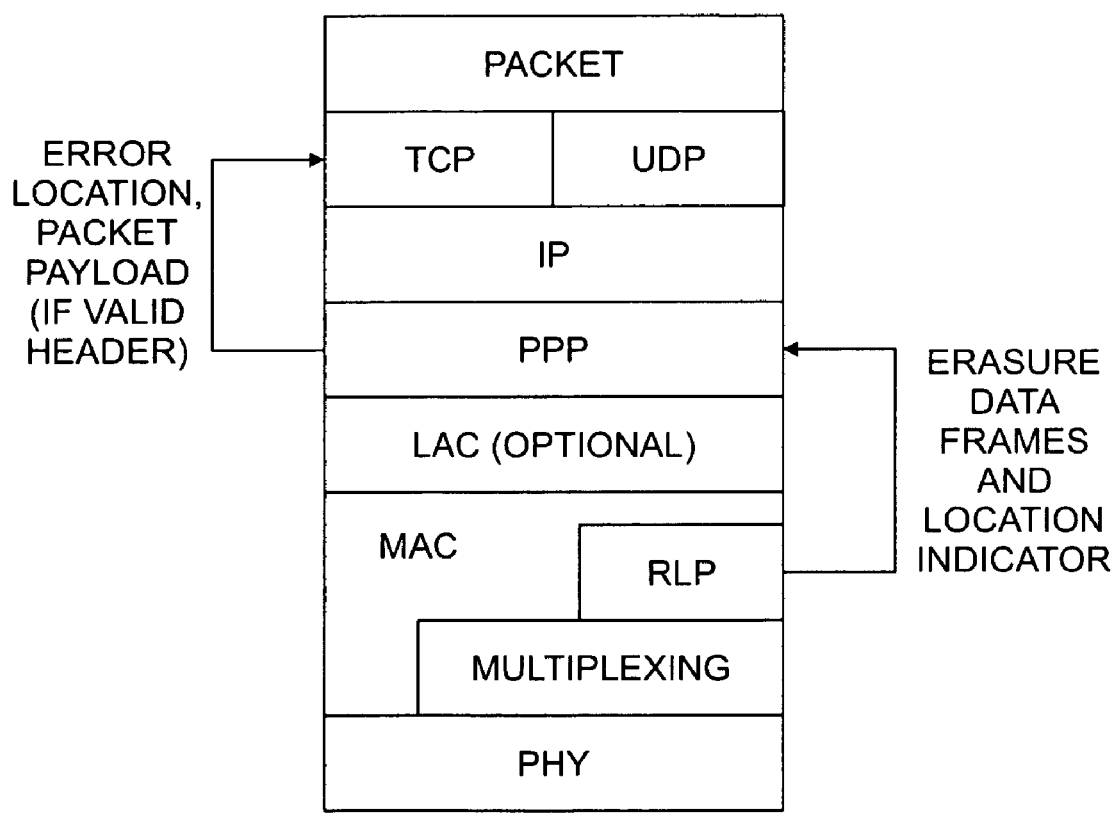
FIG. 6 illustrates a type II Forward Erasure Frame+Erasure Indicator RLP/PPP Option for the illustrative UMTS/CDMA 2000 layer structure of FIG. 3A that forwards erasure date frames and error location information to the PPP layer and packet payloads plus error location to the TCP/UDP layer in accordance with the present invention.

In the third implementation, referred to as the type II Forward Erasure Frame+Erasure Indicator Option and shown in FIG. 6 for the illustrative UMTS/CDMA 2000 layer structure, both the RLP and PPP layers are modified. The RLP layer forwards both erasure data frames and location indicator information to the PPP layer, and the PPP layer upon validating the packet header, forwards both erasure data frames and updated location indicator information to the TCP/UDP layer (since the PPP layer has to remove the PPP packet header, the error location indicator has to be changed accordingly). The UDP layer can forward the error location indicator in addition to the packet payload to the application layer, so that additional channel information is provided to the application layer.

The existing RLP/PPP design discards the entire packet while only a small part of the packet is damaged. The RLP/PPP design of the present invention allows packets with partially corrupted payloads to still be forwarded to the UDP layer and then to the application layer. In this case, the application has access to all the usable information and can decide whether and how to utilize the information. As such, the proposed scheme provides a high degree of flexibility and efficiency.

It is to be understood that the embodiments and variations shown and described herein are merely illustrative of the principles of this invention and that various modifications may be implemented by those skilled in the art without departing from the scope and spirit of the invention.

We claim:

1. A method for processing multimedia data in a Radio Link Protocol (RLP) layer of a wireless packet network, said method comprising the steps of:

processing said multimedia to determine if said multimedia data is properly received;

forwarding erasure data frames with said multimedia data to a Point-to-Point Protocol (PPP) layer; and forwarding a location indicator of said erasure data frames to said PPP layer.

2. The method of claim 1, further comprising the step of representing said erasure data frames in a predefined form.

3. The method of claim 2, wherein said predefined form is the original received data frames.

4. The method of claim 2, wherein said predefined form is a binary pattern comprised of all ones.

5. The method of claim 2, where said predefined form is a binary pattern comprised of all zeroes.

6. A method for processing multimedia in a Point-to-Point Protocol (PPP) layer of a wireless packet network, said method comprising the steps of:

receiving erasure data frames with said multimedia data from a Radio Link Protocol (RLP) layer;
replacing said erasure data frames with a predefined binary value; and
forwarding a packet payload to a higher layer if a valid header is received even if said packet payload is not properly received.

7. The method of claim 6, wherein said predefined binary value is an all zeroes pattern.

8. The method of claim 6, wherein said predefined binary value is an all ones pattern.

9. The method of claim 6, wherein said predefined binary value is the original received data frames.

10. The method of claim 6, further comprising the step of receiving a location indicator of said erasure frames from said RLP layer.

11. The method of claim 10, further comprising the step of using said location indicator to detect if a packet header is corrupted.

12. The method of claim 11, further comprising the step of forwarding a packet payload to a higher layer if a valid header is received.

13. The method of claim 11, where the PPP layer updates the location indicator and forwards it to a higher layer if a valid header is received.

14. A method for processing multimedia data in a receiver of a wireless packet network, said receiver conforming to an open system interconnection (OSI) model, said OSI model having a plurality of layers including a Radio Link Protocol (RLP) layer, a set of interface layers and a User Datagram Protocol (UDP) layer, said method comprising the steps of:
processing said multimedia data to determine if said multimedia data is properly received; and
communicating error information between said RLP and UDP layers, wherein said RLP layer forwards an indication of a location of erasure data to said UDP layer.

15. The method of claim 14, wherein said RLP layer forwards an erasure data frame to said set of interface layers.

16. The method of claim 15, further comprising the step of forwarding packets with erasure data frames to said UDP layer.

17. The method of claim 14, further comprising the step of updating the location of said erasure data and forwarding it to said UDP layer.

18. A system for processing multimedia data in a Radio Link Protocol (RLP) layer of a wireless packet network, said system comprising:
a memory for storing computer readable code; and
a processor operatively coupled to said memory, said processor configured to:
process said multimedia data to determine if said multimedia data is properly received;

forward erasure data frames with said multimedia data to a Point-to-Point Protocol (PPP) layer; and
forward a location indicator of said erasure data frames to said PPP layer.

19. A system for processing multimedia data in a Point-to-Point (PPP) layer of a wireless packet network, said system comprising:
a memory for storing computer readable code; and
a processor operatively coupled to said memory, said processor configured to:
receiving erasure data frames with said multimedia data from a Radio Link Protocol (RLP) layer;
replacing said erasure data frames with a predefined binary value; and
forwarding a packet payload to a higher layer if a valid header is received even if said packet payload is not properly received.

20. The system of claim 19, wherein said predefined binary value is an all zeroes pattern.

21. The system of claim 19, wherein said predefined binary value is an all ones pattern.

22. The system of claim 19, wherein said predefined binary value is the original received data frames.

23. The system of claim 19, wherein said processor is further configured to receive a location indicator of said erasure frames from said RLP layer.

24. The system of claim 23, wherein said processor is further configured to use said location indicator to detect if a packet header is corrupted.

25. The system of claim 24, wherein said processor is further configured to forward a packet payload to a higher layer if a valid header is received.

26. A system for processing multimedia data in a receiver of a wireless packet network, said receiver conforming to an open system interconnection (OSI) model, said OSI model having a plurality of layers including a Radio Link Protocol (RLP) layer, a set of interface layers and a User Datagram Protocol (UDP) layer, said system comprising:
a memory for storing computer readable code; and
a processor operatively coupled to said memory, said processor configured to:
processing said multimedia data to determine if said multimedia data is properly received; and
communicating error information between said RLP and UDP layers, wherein said RLP layer forwards an indication of a location of erasure data to said UDP layer.

27. The system of claim 26, wherein said RLP layer forwards an erasure data frame to said UDP layer.

* * * * *